(12) United States Patent
Kwon et al.

(10) Patent No.: US 8,654,704 B2
(45) Date of Patent: Feb. 18, 2014

(54) SYSTEM AND METHOD FOR DISTRIBUTED CONTROL OF SPECTRUM POWER IN A MULTI-CELL COMMUNICATION SYSTEM

(75) Inventors: Tae Soo Kwon, Hwaseong-si (KR); Won-Jae Shin, Yongin-si (KR); Chang Yong Shin, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 726 days.

(21) Appl. No.: 12/732,007

(22) Filed: Mar. 25, 2010

(65) Prior Publication Data

US 2011/0075580 A1 Mar. 31, 2011

(30) Foreign Application Priority Data

Sep. 28, 2009 (KR) .................. 10-2009-0091537

(51) Int. Cl.
*H04W 4/00* (2009.01)
*H04B 7/212* (2006.01)
*H04W 40/00* (2009.01)
*H04W 72/00* (2009.01)

(52) U.S. Cl.
USPC ........... 370/328; 370/348; 455/446; 455/447; 455/450

(58) Field of Classification Search
USPC ............... 370/321, 328, 330, 332, 337, 345, 370/347–348, 469; 455/67.3, 84, 550.1, 455/418, 428, 443, 445, 446, 447, 448, 455/450–455, 452.1
See application file for complete search history.

(56) References Cited

U.S. PATENT DOCUMENTS

| 4,144,411 A | * | 3/1979 | Frenkiel | ................ 455/447 |
| 2008/0057933 A1 | | 3/2008 | Brunner | |
| 2008/0298486 A1 | | 12/2008 | Venturino et al. | |
| 2009/0047916 A1 | * | 2/2009 | Haykin | ................ 455/115.1 |
| 2009/0061778 A1 | | 3/2009 | Vrzic et al. | |

FOREIGN PATENT DOCUMENTS

| JP | 2003-046437 | 2/2003 |
| KR | 10-2006-0047736 | 5/2006 |
| KR | 10-2008-0088765 | 10/2008 |

* cited by examiner

*Primary Examiner* — Kwang B Yao
*Assistant Examiner* — Adam Duda
(74) *Attorney, Agent, or Firm* — NSIP Law

(57) ABSTRACT

A system and method for distributed control of spectrum power in a multi-cell communication system are provided. A plurality of cells included in a multi-cell communication system may be grouped into a plurality of groups. Cells included in a first group may iteratively calculate spectrum powers to perform dynamic spectrum management (DSM) scheme in calculation sub-frames. The cells included in the first group may also perform a user scheduling. Spectrum powers determined by cells included in a second group and user scheduling results of the cells in the second group may be held static.

10 Claims, 14 Drawing Sheets

SYSTEM AND METHOD FOR DISTRIBUTED CONTROL OF SPECTRUM POWER IN A MULTI-CELL COMMUNICATION SYSTEM

CROSS-REFERENCE TO RELATED APPLICATION(S)

This application claims the benefit under 35 U.S.C. §119 (a) of Korean Patent Application No. 10-2009-0091537, filed on Sep. 28, 2009, in the Korean Intellectual Property Office, the entire disclosure of which is incorporated herein by reference for all purposes.

BACKGROUND

1. Field

The following description relates to a dynamic spectrum management (DSM) scheme, and more specifically, to a DSM scheme for a multi-cell communication system including a plurality of cells.

2. Description of Related Art

Studies have been conducted regarding a communication system including a plurality of cells, in order to improve data transmission rate and reliability of a communication based on limited radio resources. The plurality of cells typically includes a cellular base station, a femto base station, a fixed base station or a mobile base station, a relay station, terminals, and the like.

Each of a plurality of base stations in the plurality of cells may substantially simultaneously use limited radio resources, for example, a frequency, a time, a code resource, and the like, to improve the efficient application of radio resources for communication with a corresponding terminal. Also, when the plurality of base stations substantially simultaneously communicates using the limited radio resources, various difficulties may arise, such as interference occurring in each terminal and a decrease in throughput due to the interference.

A dynamic spectrum management (DSM) scheme is proposed to reduce the difficulties due to the interference. According to a DSM scheme, each of the plurality of base stations dynamically adjusts spectrum powers to decrease interference received in other cells.

Also, an iterative water filling (IWF) scheme has been proposed to reduce a difficulty caused by interference occurring between various copper wires in a single binder, with respect to a DSM scheme that is applied to a wired Digital Subscriber Line (DSL) communication system. An IWF scheme optimizes spectrum powers of a desired signal, according to an assumption that spectrum powers of a signal transmitted from another transmitter are held static for each copper wire. Based on the IWF scheme, when a single transmitter updates the spectrum powers, spectrum powers of other transmitters are held static.

When the IWF scheme for the wired DSL communication system is applied to a wireless communication system, a plurality of cells sequentially updates spectrum powers. Accordingly, the IWF scheme for the wired DSL communication system may be difficult to implement. Also, since a given cell may perform scheduling of a plurality of users in the wireless communication system, a user scheduling may be changed in real time, presenting further difficulties in implementing the IWF scheme for the wired DSL communication system to the wireless communication system.

SUMMARY

According to one general aspect, there is provided a communication method for a target cell of a multi-cell communication system, the communication method including identifying calculation sub-frames determined for a first group of cells, the group of cells including the target cell among a plurality of cells included in the multi-cell communication system, iteratively calculating, in the calculation sub-frames, spectrum powers for performing a dynamic spectrum management (DSM) scheme. The plurality of cells are classified into a plurality of groups, and calculation sub-frames for at least one cell included in the first group of cells are distinct from calculation sub-frames for at least one cell included in a second group of cells.

Spectrum powers may be calculated by cells included in the second group of cells. A result of a user scheduling of the cells included in the second group of cells may be held static in the calculation sub-frames determined for the first group of cells.

Also, the communication method may further include iteratively performing, in the calculation sub-frames, user scheduling in a candidate user set included in the target cell. The spectrum powers may be calculated for performing the DSM scheme according to a result of the user scheduling.

The plurality of groups may be determined according to identifications (IDs) of the plurality of cells or relative locations of the plurality of cells.

The multi-cell communication system may be a hierarchical cell communication system including at least one macrocell and at least one of a femtocell and a picocell.

The communication method may further include transmitting data to at least one scheduled user according to the calculated spectrum powers.

The communication method may further include periodically or aperiodically updating the candidate user set.

The candidate user set may be periodically or aperiodically updated in a predetermined sub-frame with respect to the first group of cells.

The spectrum powers may be calculated according to a weighted sum of spectrum powers calculated by a previous iteration and spectrum powers calculated by a current iteration.

Each of the plurality of cells may calculate corresponding spectrum powers for the respective each of the plurality of cells.

According to another general aspect, there is provided a communication method for a target cell of a multi-cell communication system, the communication method including setting, in a first sub-frame among a plurality of sub-frames in a DSM sub-frame group, a candidate user set with respect to a target cell among a plurality of cells included in the multi-cell communication system, iteratively performing, in at least two second sub-frames among the plurality of sub-frames, a user scheduling in the candidate user set, and iteratively calculating spectrum powers for performing a DSM scheme in the at least two second sub-frames, according to a result of the user scheduling.

The communication method may further include updating the candidate user set according to the DSM sub-frame group.

Each of the plurality of cells included in the multi-cell communication system may perform a user scheduling in the first sub-frame and may calculate corresponding spectrum powers for performing the DSM scheme in the at least two second sub-frames.

According to another general aspect, there is provided a communication method for a target cell of a multi-cell communication system, the communication method including identifying a calculation time for determining spectrum powers for performing a DSM scheme, by an iterative calculation, and determining whether the DSM scheme is applicable to a target terminal according to the calculation time.

The communication method may further include transferring, to a base station of the target cell, information with respect to a result of the determination.

The determining may determine whether the DSM scheme is applicable according to a comparison of the calculation time and an acceptable delay of a target traffic.

The calculation time may be a calculation time for determining the spectrum powers according to a result of a user scheduling.

The communication method may further include allocating a radio resource to the target terminal with respect to a result of the determination. A radio resource for when the DSM scheme is applicable may be distinct from a radio resource for when the DSM scheme is not applicable.

According to another general aspect, there is provided a computer readable storage medium storing a program to apply a DSM scheme to a multi-cell communication system, including instructions to cause a computer to identify calculation sub-frames determined for a first group of cells, the group of cells including the target cell among a plurality of cells included in the multi-cell communication system, and iteratively calculate, in the calculation sub-frames, spectrum powers to perform a DSM scheme. The plurality of cells are classified into a plurality of groups, and calculation sub-frames for at least one cell included in the first group of cells are distinct from calculation sub-frames for at least one cell included in a second group of cells.

According to certain examples, a calculation time for determining spectrum powers may be reduced by classifying a plurality of cells into a plurality of groups. Cells included in a same group may calculate spectrum powers at substantially the same time and perform a user scheduling.

According to certain examples, spectrum powers may be calculated according to a user scheduling result and thus, improved spectrum powers may be provided.

According to certain examples, a DSM sub-frame group including a sub-frame where a candidate user set may be set, and sub-frames where spectrum powers are calculated and user scheduling is performed may be provided. Accordingly, a solution that is to improve a DSM scheme may be provided.

Other features and aspects will be apparent from the following detailed description, the drawings, and the claims.

Figure 1:
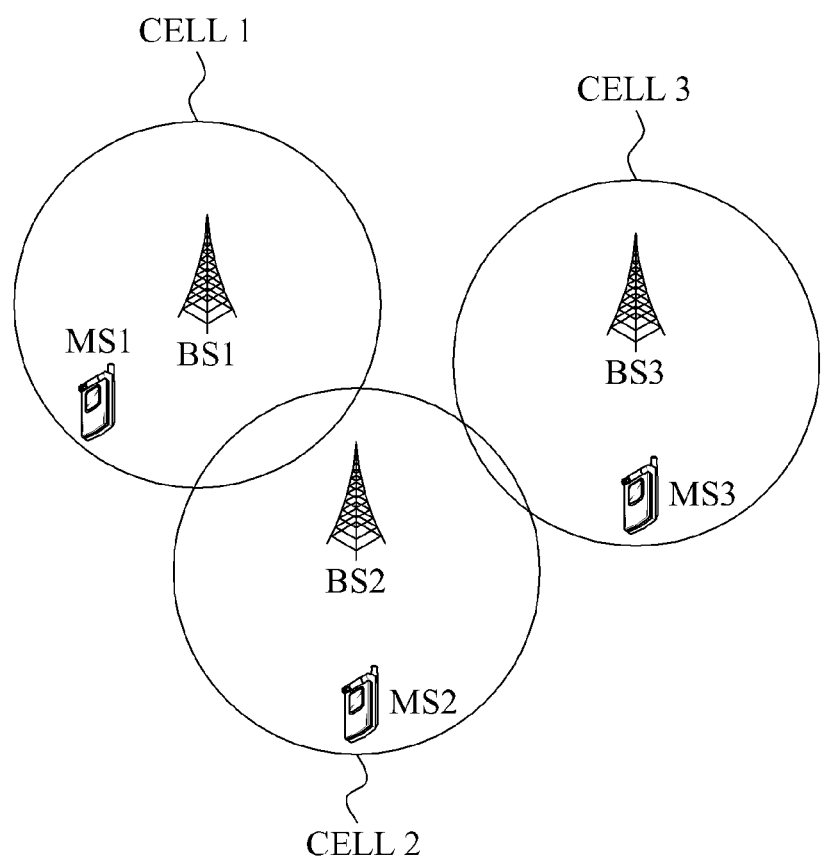
FIG. 1 is a diagram illustrating an example of a multi-cell communication system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 illustrates an example of a multi-cell communication system.

Referring to FIG. 1, the multi-cell communication system includes a plurality of cells, and each of the plurality of cells includes a single transmission and reception pair. More particularly, a cell 1 includes a first base station (BS1) and a first terminal (MS1), a cell 2 includes a second base station (BS2) and a second terminal (MS2), and a cell 3 includes a third base station (BS3) and a third terminal (MS3). Furthermore, each of the plurality of cells may include two or more transmission and reception pairs. That is, a "user scheduling" to select at least one user from among a plurality of users may be implemented for at least one of the plurality of cells.

When the plurality of transmission and reception pairs uses same radio resources, interference between the plurality of transmission and reception pairs may occur. However, the interference may be reduced by an implementation of a dynamic spectrum management (DSM) scheme.

According to the DSM scheme, each of the plurality of cells estimates an amount of interference generated in other cells based on a status of a desired channel and a status of interference channels, and calculates corresponding spectrum powers to substantially minimize the interference. As an example, when the cell 1 uses frequency bands F1, F2, and F3, the cell 1 increases a spectrum power in the frequency band F1 based on an amount of interference generated in the cell 2 and the cell 3, and also decreases spectrum powers in the frequency bands F2 and F3. In the same manner, the cell 2 and the cell 3 may also perform an operation similar to the operation performed by the cell 1. Therefore, the cell 1, the cell 2, and the cell 3 may obtain improved spectrum powers.

Particularly, when the cell 1, the cell 2, and the cell 3 calculate spectrum powers according to an iterative water filling (IWF) scheme, a relatively high number of iteration operations may be executed. That is, each of the cell 1, the cell 2, and the cell 3 may sequentially calculate and update corresponding spectrum powers while the spectrum powers of other cells are held static. As an example, while the spectrum powers of the cell 2 and the cell 3 are held static, the spectrum powers of the cell 1 are calculated and updated. After calculating and updating the spectrum powers of the cell 1, while the spectrum powers of the cell 3 are held static, the spectrum powers of the cell 2 are calculated and updated. Similarly, after the spectrum powers of the cell 2 are calculated and updated, while the spectrum powers of the cell 1 and the cell 2 are held static, the spectrum powers of the cell 3 are calculated and updated. After iteratively performing the above operations, improved spectrum powers of each of the cell 1, the cell 2, and the cell 3 are obtained.

When spectrum powers of each of the cell 1, cell 2, and the cell 3 are calculated based on the above operations, various issues may arise. First, since each of the cells sequentially calculates spectrum powers, the amount of calculation time is relatively large. Second, a relatively large amount of overhead may arise when the above operations are applied to the wireless communication system.

Figure 2:
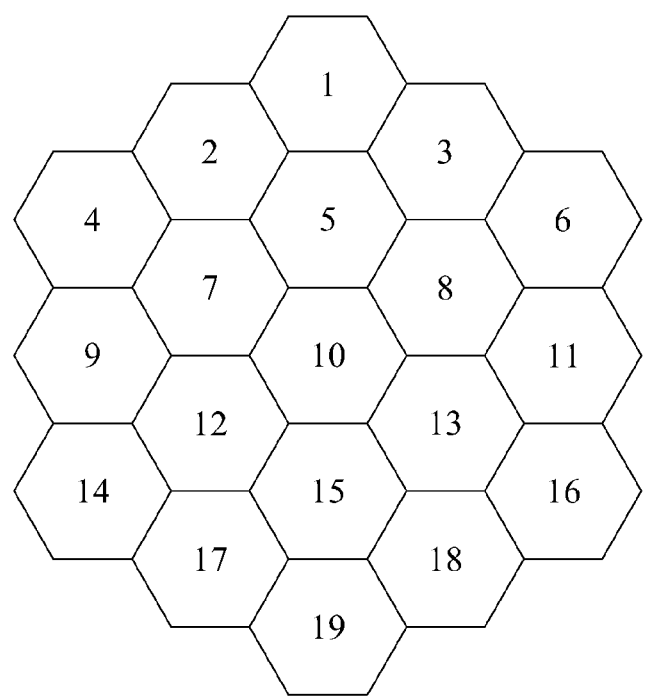
FIG. 2 is a diagram illustrating an example of a multi-cell communication system including a plurality of cells that calculate spectrum powers based on an iterative water filling (IWF) scheme.

FIG. 2 illustrates an example of a multi-cell communication system including a plurality of cells that calculate spectrum powers based on an IWF scheme.

Figure 3:
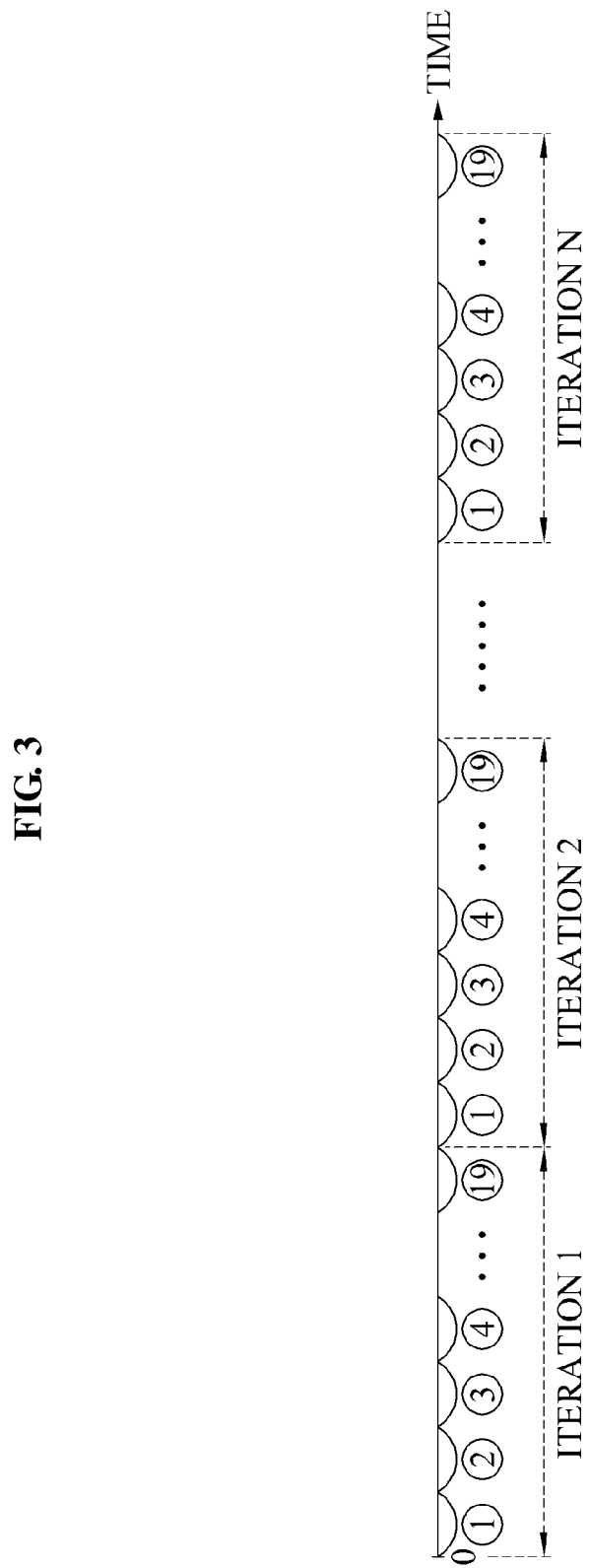
FIG. 3 is a diagram illustrating an example of a process for iteratively calculating spectrum powers by each of a plurality of cells included in the multi-cell communication system of FIG. 2.

FIG. 3 illustrates an example of a process for iteratively calculating spectrum powers by each of a plurality of cells included in the multi-cell communication system of FIG. 2.

Referring to FIGS. 2 and 3, one example of a multi-cell communication system includes 19 cells. When the 19 cells calculate spectrum powers based on the IWF scheme, each of the 19 cells sequentially calculates the spectrum powers.

As an example, when a cell 1 calculates and updates its corresponding spectrum powers, spectrum powers of cell 2 through cell 19 are held static. After calculating and updating the spectrum powers of cell 1, the spectrum powers of the cell 3 through the cell 19 are held static, and the cell 2 may calculate and update its corresponding spectrum powers. Similarly, when the cell 19 updates its corresponding spectrum powers, it is assumed that all the cells calculate corresponding spectrum powers only once. The above operations are iteratively performed until all the cells update their corresponding spectrum power a predetermined number N times.

Figure 4:
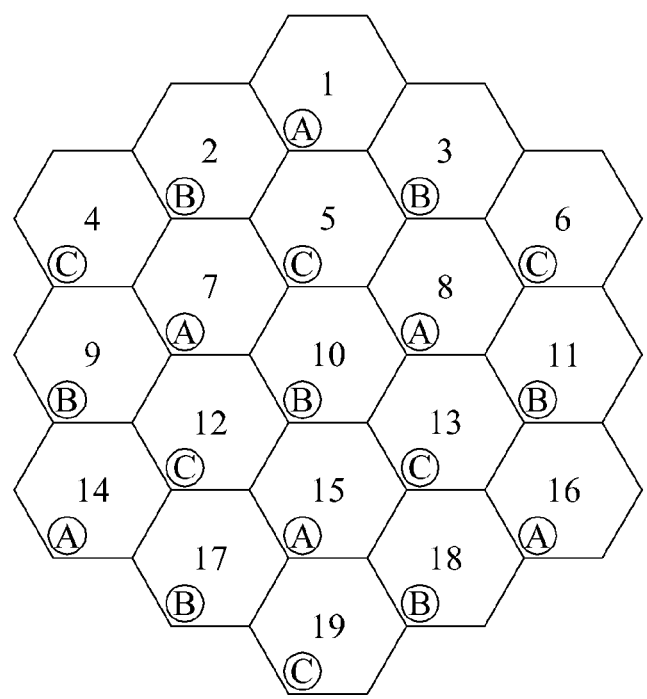
FIG. 4 is a diagram illustrating an example of a plurality of cells classified into a plurality of groups.

FIG. 4 illustrates an example of a plurality of cells classified into a plurality of groups.

As illustrated in FIG. 4, a plurality of cells may be classified into a plurality of groups. As an example, the groups are determined based on identifications (IDs) of cells or relative locations of the cells. As illustrated in FIG. 4, adjacent cells may be classified into different groups.

In the example illustrated in FIG. 4, cells 1, 7, 8, 14, 15, and 16 may be classified as a group A, cells 2, 3, 9, 10, 11, 17, and 18 may be classified as a group B, and cells 4, 5, 6, 12, 13, and 19 may be classified as a group C. Cells included in a same group may perform a user scheduling in the same calculation sub-frames, and may calculate spectrum powers based on a user scheduling result. In the calculation sub-frames of this example, cells included in other groups may not change a user scheduling and may not change spectrum powers, such that spectrum powers may be held static.

As an example, while the cells included in the group A perform a user scheduling in given calculation sub-frames and calculate spectrum powers based on a result of the user scheduling, cells included in the groups B and C may hold static user scheduling results performed in advance and spectrum powers calculated in advance. After the cells included in the group A perform the user scheduling and calculate spectrum powers, the cells included in the group B perform a user scheduling and calculate spectrum powers, and the cells included in the group A and C hold static user scheduling results performed in advance and spectrum powers calculated in advance.

Similarly, each of the plurality of cells iteratively performs a user scheduling in a corresponding candidate user set and calculates spectrum powers. When the calculated spectrum powers converge, the user scheduling is performed, and when a number of times of calculating spectrum powers is greater than a predetermined number N, the iterative operations are complete and final spectrum powers may be determined To improve convergence of an algorithm that calculates spectrum powers, each of the cells may hold static a candidate user set that is a target of the user scheduling, during a predetermined time period. That is, each of the cells may perform the user scheduling only in the candidate user set, and the candidate user set may be periodically or aperiodically updated at every predetermined time section.

Figure 5:
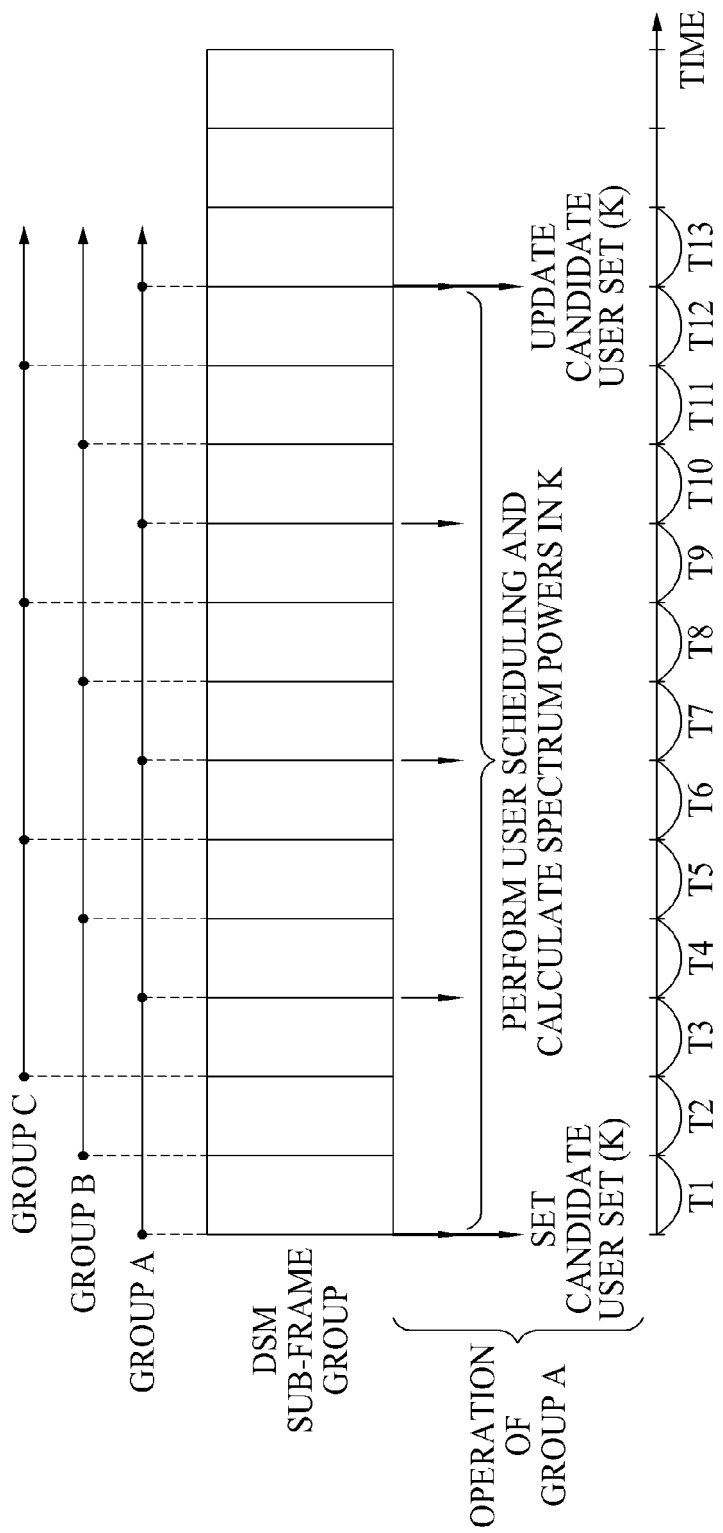
FIG. 5 is a diagram illustrating an example of a process for iteratively calculating spectrum powers and performing user scheduling by each of a plurality of groups.

FIG. 5 illustrates an example of a process for iteratively calculating spectrum powers and performing user scheduling by each of a plurality of groups.

Cells included in each of the plurality of groups may determine a candidate user set according to a DSM sub-frame group illustrated in FIG. 5, perform a user scheduling, and calculate spectrum powers.

The DSM sub-frame group may include a plurality of sub-frames. Each of the sub-frames may have a predetermined length of time, for example 1 millisecond, and each of the groups may perform the user scheduling according to sub-frames and may calculate spectrum powers. In addition, a sub-frame where cells included in each group may update the candidate user set may be determined in advance.

An example of an operation of group A is illustrated in a bottom of a DSM sub-frame group of FIG. 5. Cells included in group A may set a candidate user set (K) in a sub-frame T1. Also, the cells may perform user scheduling in the candidate user set (K) in sub-frames T1, T4, T7, and T10, and may calculate spectrum powers for a DSM scheme based on a user scheduling result. In this example, cells included in group B and group C hold static both a user scheduling result and spectrum powers in sub-frames T1, T4, T7, and T10. In the sub-frame T3, the candidate user set (K) is updated, user scheduling is performed again, and spectrum powers are calculated. Here, the sub-frames T1, T4, T7, and T10 may be referred to as calculation sub-frames of the group A.

As a particular example, in the sub-frame T1, the cells included in group A perform user scheduling and calculate the spectrum powers for a DSM scheme based on a user scheduling result. In this example, in the sub-frame T1, the cells included in group B and group C hold static the user scheduling result and the spectrum powers. In the sub-frame T2, the user scheduling result of the cells included in group A and the calculated spectrum powers are held static, and each of the cells included in group B performs user scheduling in its own candidate user set and calculates spectrum powers for a DSM scheme based on a result of the user scheduling. Also, in the sub-frame T3, the user scheduling result and the calculated spectrum powers of the cells included in group A and group B are held static, and each of the cells included in group C performs user scheduling in its own candidate user set and calculates spectrum powers for a DSM scheme based on a result of the user scheduling. Accordingly, each of the cells perform user scheduling and calculate spectrum powers only once during sub-frames T1 through T3. The above operations are iteratively executed until the spectrum powers calculated by the all cells converge or a number of iterations is equal to a predetermined number N.

Therefore, according to certain examples, a plurality of cells included in a same group may iteratively and substantially simultaneously calculate spectrum powers, such that a calculation time for obtaining final spectrum powers may be decreased. In addition, user scheduling may be performed only in a candidate user set that is periodically or aperiodically updated, such that convergence of an algorithm that calculates spectrum powers may be improved. Also, certain examples may calculate spectrum powers based on a result of user scheduling, that that an improved DSM scheme may be implemented.

Figure 6:
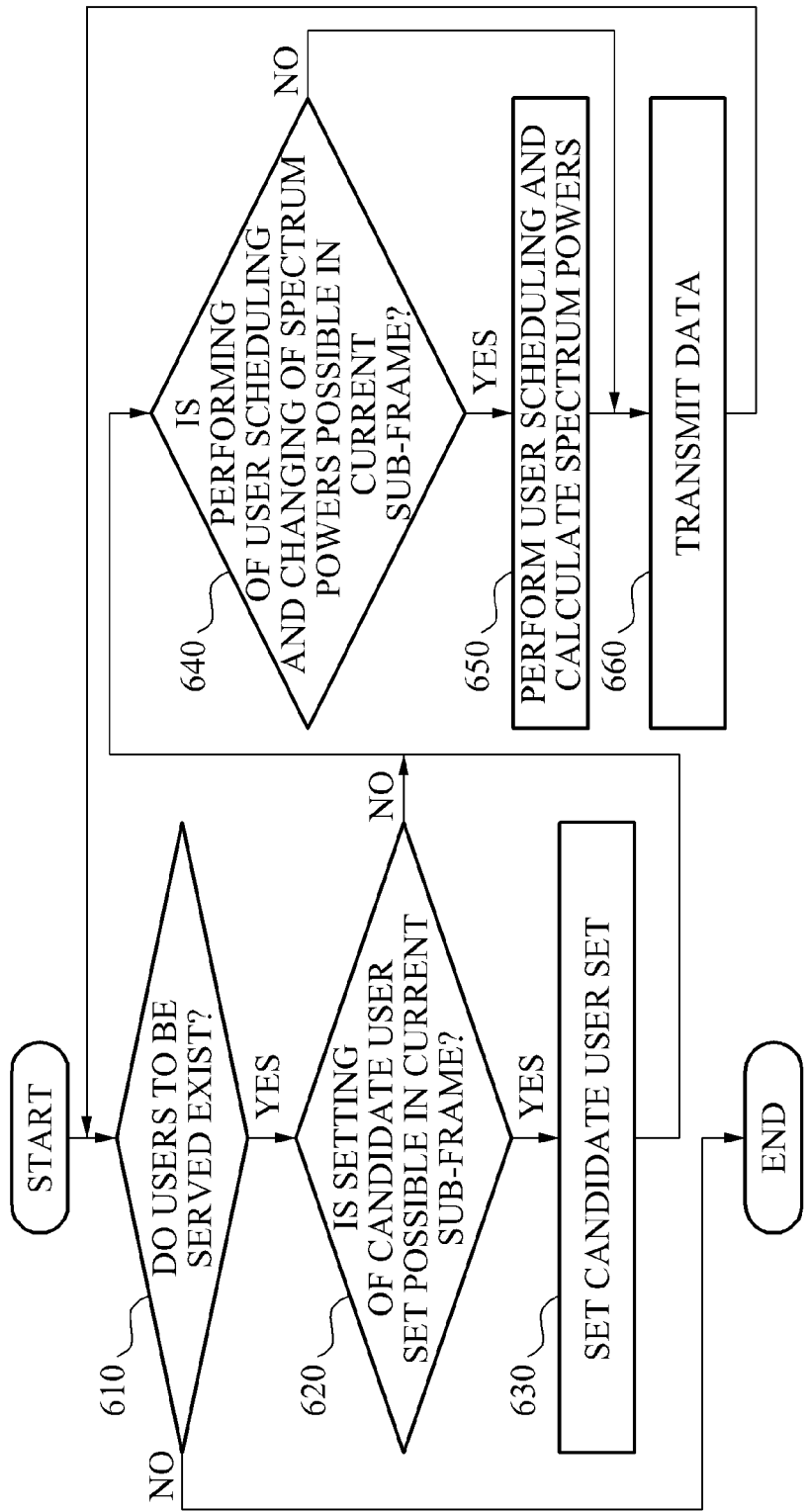
FIG. 6 is a flowchart illustrating an example of a communication method of a base station corresponding to each of the plurality of cells.

FIG. 6 illustrates an example of a communication method of a base station corresponding to each of the plurality of cells.

Referring to FIG. 6, a base station determines whether users to be served exist in operation 610. As an example, the base station may determine if users to be served exist according to an amount of traffic at the base station.

Also, the base station determines whether a candidate user set may be set in a current sub-frame in operation 620. As an example, base stations included in group A of FIG. 5 may set or update the candidate user set only in sub-frames T1 and T12, such that the base station may determine whether a current sub-frame is one of sub-frames T1 and T12.

If the candidate user set may be set in the current sub-frame, the base station may set the candidate user set in operation 630. The candidate user set is a search target when user scheduling is performed. Further, the candidate user set may be periodically or aperiodically updated.

Conversely, if the candidate user set may not be set in the current sub-frame, a previously set candidate user set may be maintained.

Also, the base station may determine whether performing user scheduling and changing spectrum powers is possible in the current sub-frame in operation 640. As an example, base stations included in group A of FIG. 5 may check whether the current sub-frame is one of sub-frames T1, T4, T7, and T10. If the current sub-frame is one of the sub-frames T1, T4, T7, and T10, base stations included in group A may perform user scheduling and updating the spectrum powers in the candidate user set in operation 650. Conversely, if the current sub-frame is none of the sub-frames T1, T4, T7 and T10, the base stations included in group A may not perform the user scheduling and accordingly the base stations hold static the spectrum powers.

Particularly, the base station may calculate a weighted sum of spectrum powers calculated by a previous iteration and spectrum powers calculated by a current iteration. Further, the base station may use the weighted sum as spectrum powers for a DSM scheme.

Also, the base station may transmit data to at least one user corresponding to a user scheduling result in operation 660. In this example, the base station may apply a DSM scheme based on the calculated spectrum powers.

Figure 7:
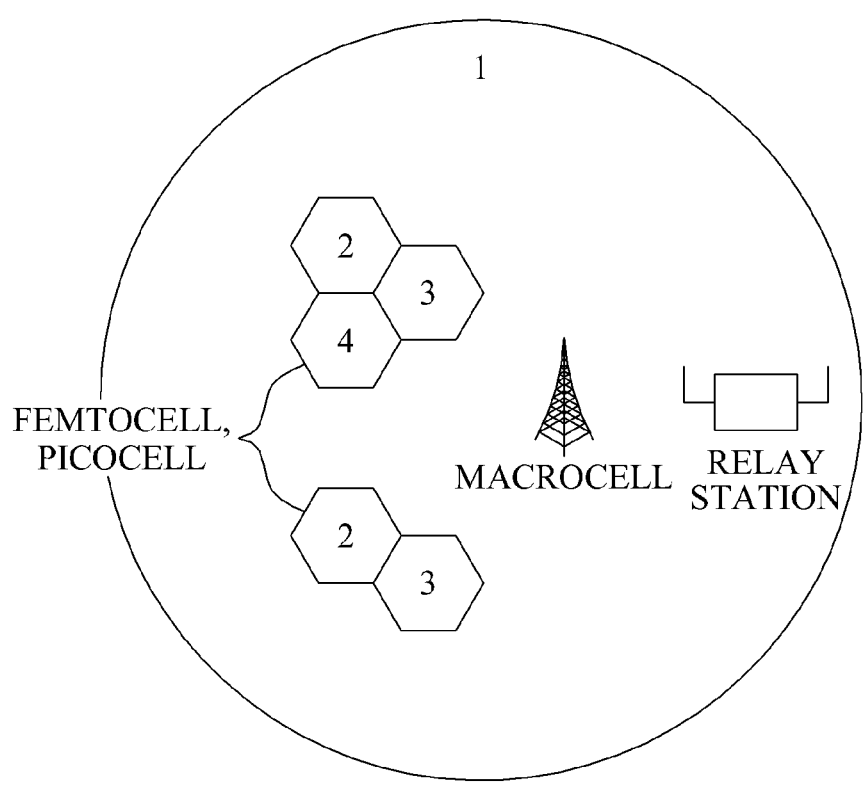
FIG. 7 is a diagram illustrating an example of a hierarchical-cell communication system.

FIG. 7 illustrates an example of a hierarchical-cell communication system.

Certain examples of methods and operations may be applied to a hierarchical-cell communication system. Referring to FIG. 7, a hierarchical-cell communication system may include a macrocell, relay station, and a plurality of femtocells or picocells. It is noted that a hierarchical-cell communication system may alternatively or additively include various other cells, stations, terminals, and the like.

In a hierarchical-cell communication system, groups may be set according to various methods. As one example, the macrocell may set the groups according to wired or wireless interface, or the groups may be randomly set. Further, the groups may be set based on a location of a femtocell or a picocell.

Figure 8:
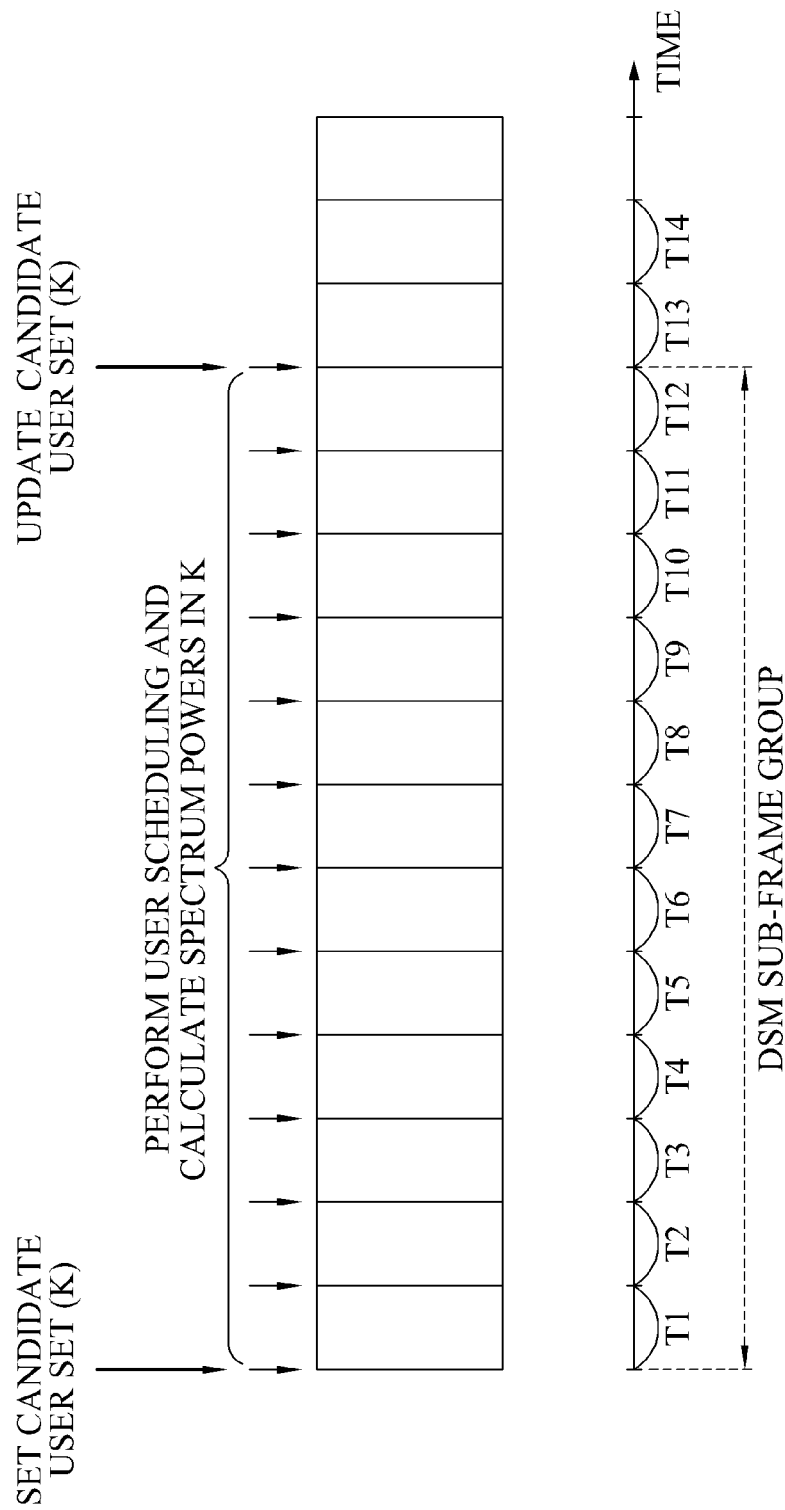
FIG. 8 is a diagram illustrating an example of a dynamic spectrum management (DSM) sub-frame group including sub-frames where a candidate user set is set and sub-frames where a user scheduling is performed and spectrum powers are calculated.

FIG. 8 illustrates an example of a DSM sub-frame group including sub-frames where a candidate user set is set and sub-frames where a user scheduling is performed and spectrum powers are calculated.

Referring to FIG. 8, certain examples of methods and operations may distinguish setting of the candidate user set (K) from performing of the user scheduling and calculating of the spectrum powers. Referring to FIG. 8, a plurality of cells may be not grouped into various groups and may simultaneously set a candidate user set (K) based on a previously set DSM sub-frame group. Accordingly, the plurality of cells performs a user scheduling and calculates spectrum powers. That is, the DSM sub-frame group is applied to each of the cells.

The DSM sub-frame group includes a sub-frame where each of a plurality of cells may set the candidate user set (K) and sub-frames where each of the plurality of cells may perform user scheduling and calculate spectrum powers. More particularly, each of the plurality of cells may set a candidate user set (K) in the sub-frame T1, and each of the plurality of cells may perform user scheduling in the candidate user set (K) in sub-frames T1 through T12 and calculate spectrum powers according to a result of the user scheduling.

According to the DSM sub-frame group illustrated in FIG. 8, a sub-frame for setting the candidate user set (K) and a sub-frame for performing user scheduling and calculating spectrum powers are distinguished from each other. Consequently, convergence of an algorithm that calculates spectrum powers may be improved. Each of the plurality of cells may not hold static the user scheduling and the spectrum powers while other cells perform the calculation; as such, the convergence may be worse compared with when spectrum powers are calculated based on an IWF scheme. However, the convergence may be improved by applying a weighed sum between a previously transmitted spectrum power and spectrum power newly calculated in a corresponding sub-frame.

Figure 9:
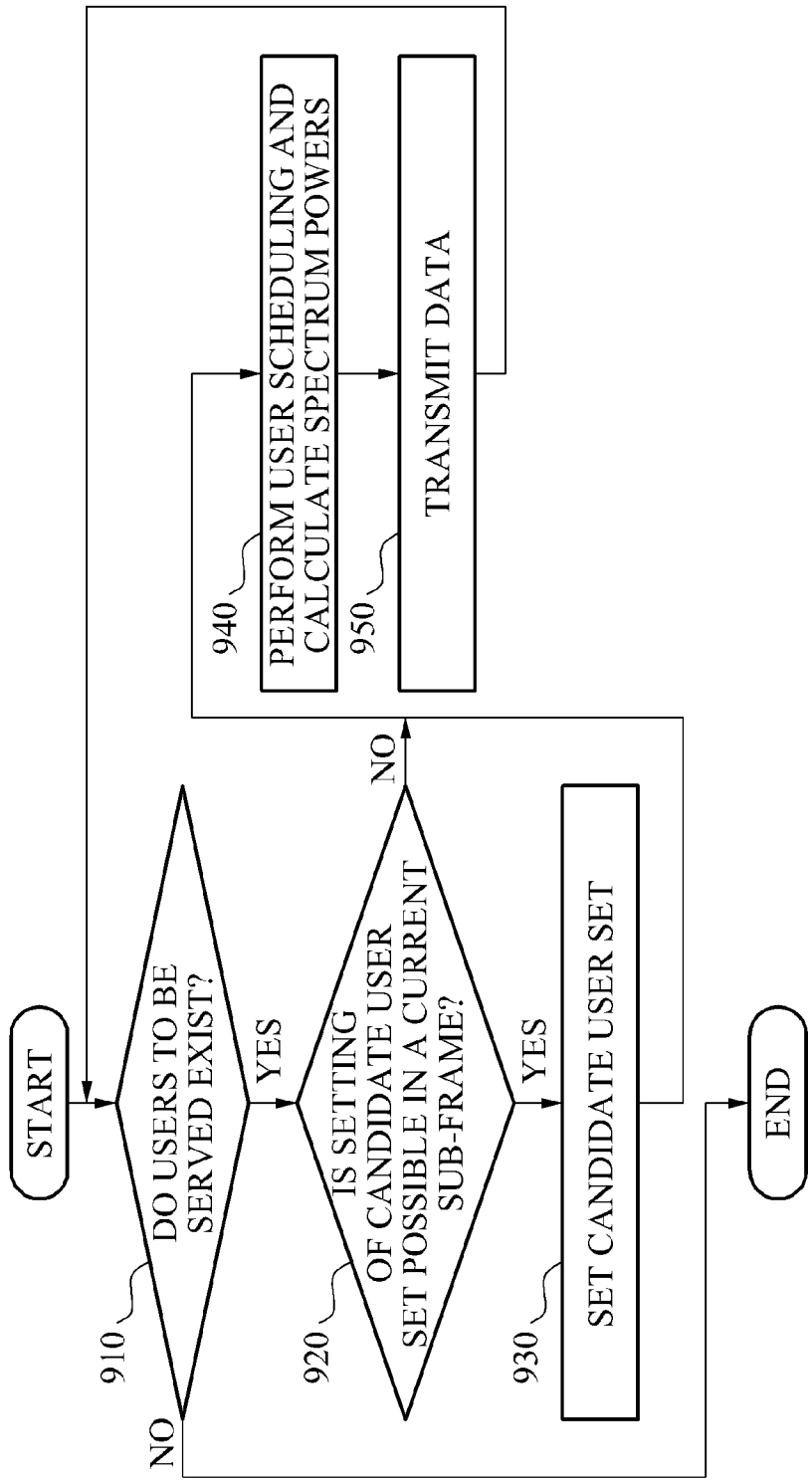
FIG. 9 is a flowchart illustrating an example of a communication method of a base station that is operated based on a DSM sub-frame group.

FIG. 9 illustrates an example of a communication method of a base station that is operated based on a DSM sub-frame group.

Referring to FIG. 9, a base station determines whether users to be served exist in operation 910. As an example, the base station may determine if users to be served exist according to an amount of traffic at the base station.

Also, the base station determines whether a candidate user set may be set in a current sub-frame in operation 920. As an example, the base station may set or update the candidate user set in the sub-frames T1 and T13, such that the base station may determine whether the current sub-frame is one of sub-frames T1 and T13.

If the candidate user set may be set in the current sub-frame, the base station may set the candidate user set in operation 930.

If the candidate user set is already set or if the candidate set may not be set in the current sub-frame set, the base station may perform user scheduling and may calculate spectrum powers in operation 940.

Also, as illustrated in FIG. 8, the base station may perform user scheduling and may calculate spectrum powers in all sub-frames. However, the base station may be limited in its operation so as to perform user scheduling and calculate spectrum powers only in predetermined sub-frames.

Operations illustrated in FIG. 9 are substantially simultaneously performed in all base stations.

Figure 10:
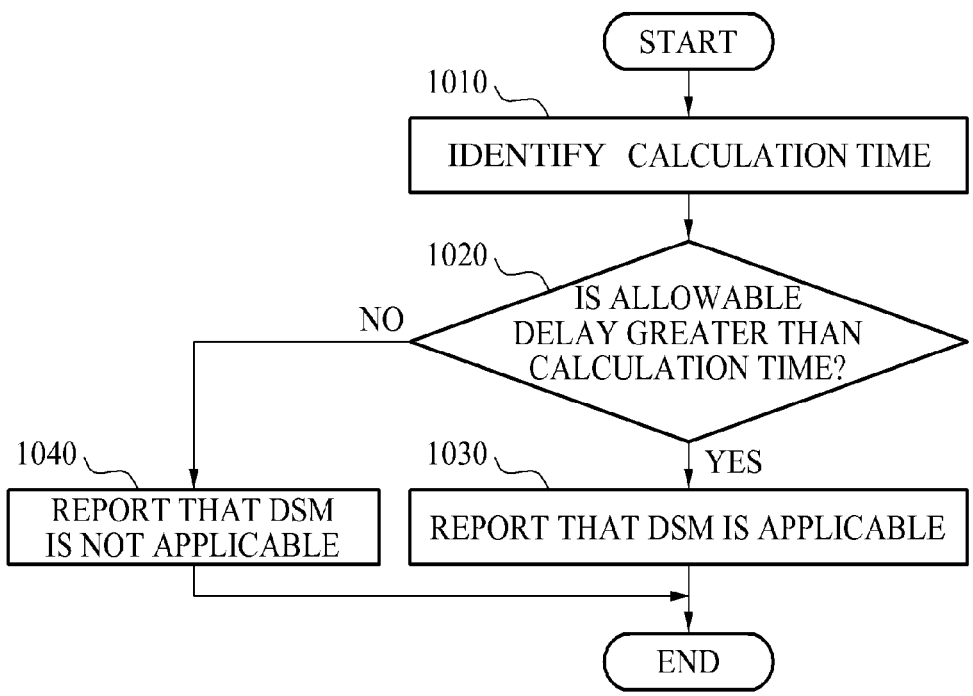
FIG. 10 is a flowchart illustrating an example of an operational method of a terminal that reports information regarding whether DSM is applicable.

FIG. 10 illustrates an example of an operational method of a terminal that reports information regarding whether DSM is applicable.

Referring to FIG. 10, a terminal according to example embodiments identifies a calculation time for determining spectrum powers to perform a DSM scheme in operation 1010.

Here, the calculation time may be a calculation time for determining the spectrum powers based on a user scheduling result, and may be determined by an iterative calculation. Information regarding the calculation time may be predicted by the terminal or may be provided to the terminal after being predicted by the base station or a network controller.

Also, the terminal according to example embodiment compares an acceptable delay with the calculation time to determine whether a DSM scheme is applicable to the terminal in operation 1020.

If the terminal determines that a DSM scheme is applicable to the terminal, according to an acceptable delay of a target traffic being greater than the calculation time, the terminal reports to the base station that a DSM scheme is applicable in operation 1030. Conversely, if the terminal determines that a DSM scheme is not applicable to the terminal, according to the acceptable delay of the target traffic being less than or equal to the calculation time, the terminal reports to the base station that a DSM scheme is not applicable in operation 1040.

Figure 11A:
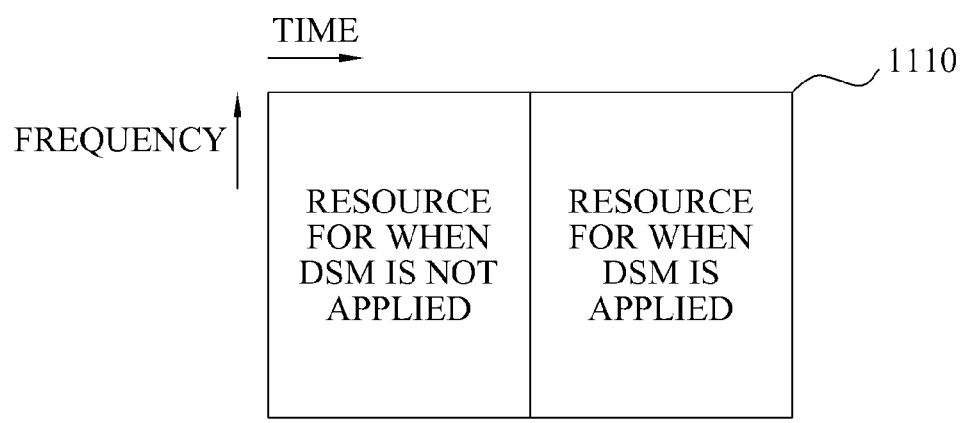
FIGS. 11A and 11B are diagrams illustrating an example of an allocated radio resource.
Figure 11B:
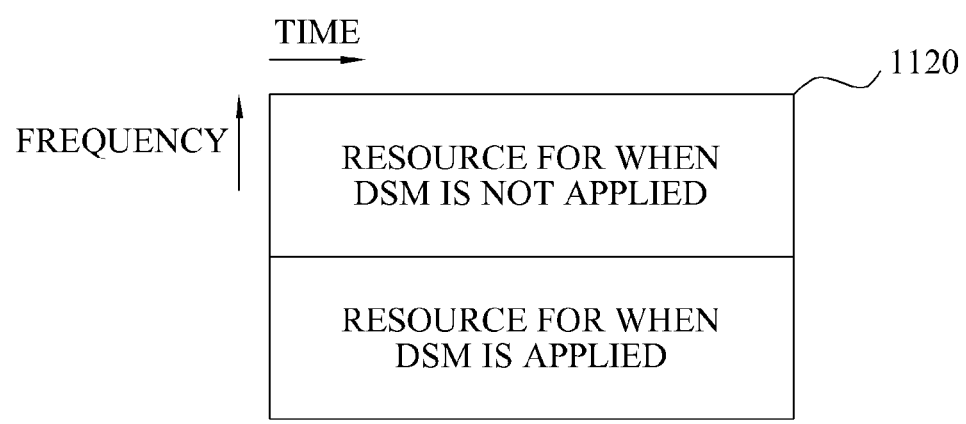

FIGS. 11A and 11B illustrate an example of an allocated radio resource.

Referring to FIG. 11A, a total radio resource may be classified into a resource for when a DSM scheme is applied and a resource for when a DSM scheme is not applied. That is, referring to a FIG. 11A, the total radio resource may be classified into a resource for when a DSM scheme is applied, based on a time distribution, and a resource for when a DSM scheme is not applied, based on the time distribution. Also, referring to FIG. 11B, the total radio resource may be classified into a resource for when a DSM scheme is applied, based on a frequency distribution, and a resource for when a DSM scheme is applied, based on the frequency distribution.

In response to the terminal reporting that a DSM scheme is applicable, base stations allocate, to the terminal, a resource for when a DSM scheme is applied. Conversely, in response to the terminal reporting that a DSM scheme is not applied, the base stations allocate, to the terminal, a resource for when a DSM scheme is not applied.

Figure 12:
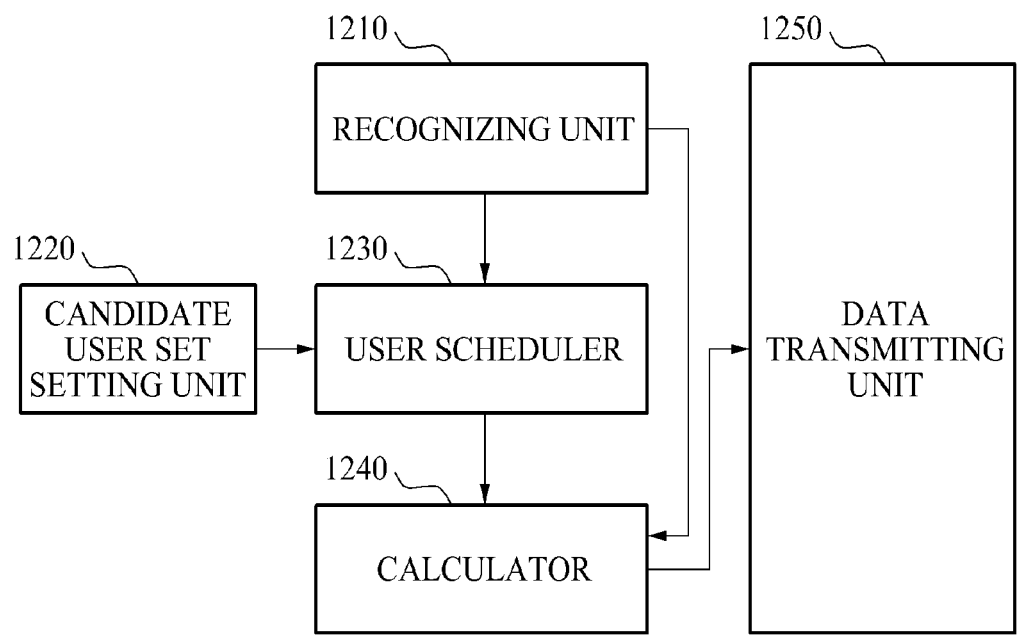
FIG. 12 is a block diagram illustrating an example of a base station.

FIG. 12 illustrates an example of a base stations.

Referring to FIG. 12, a base station may include a recognizing unit 1210, a candidate user set setting unit 1220, a user scheduler 1230, a calculator 1240, and a data transmitting unit 1250.

The recognizing unit 1210 identifies calculation sub-frames that are determined for a group of cells including the base station. The recognizing unit 1210 also identifies sub-frames where a candidate user set may be set or updated.

If the candidate user set may be set or updated, the candidate user set setting unit 1220 may set or update the candidate user set in the sub-frames.

Also, the user scheduler 1230 may perform user scheduling in the candidate user set in the calculation sub-frames, and the calculator 1240 may calculate spectrum powers to apply a DSM scheme according to a result of the user scheduling.

The data transmitting unit 1250 may transmit data according to a DSM scheme based on spectrum powers.

Figure 13:
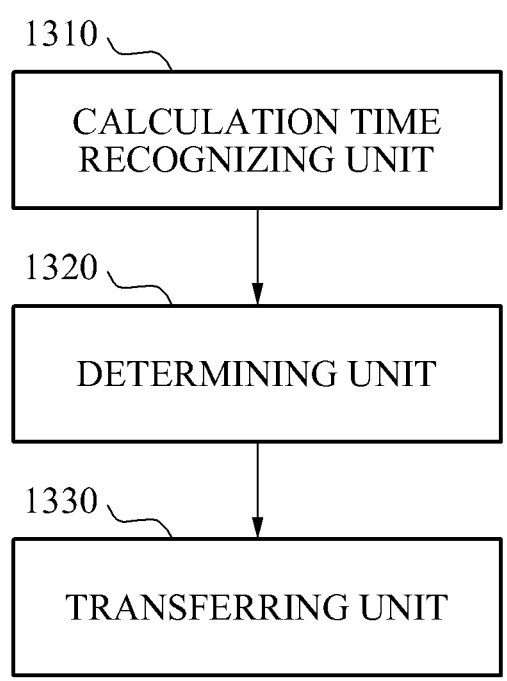
FIG. 13 is a block diagram illustrating an example of a terminal.

FIG. 13 illustrates an example of a terminal.

Referring to FIG. 13, a terminal may include a calculation time recognizing unit 1310, a determining unit 1320, and a transferring unit 1330.

The calculation time recognizing unit 1310 may identify a calculation time for determining spectrum powers to perform a DSM scheme. Information regarding the calculation time may be estimated by the terminal, or may be provided to the terminal after being estimated by a base station or a network controller. The calculation time may be a calculation time for determining the spectrum powers based on a user scheduling result, and may be determined by an iterative calculation.

Also, the determining unit 1320 may determine whether a DSM scheme is applicable to a target terminal based on a calculation time. Accordingly, the determining unit 1320 may determine whether a DSM scheme is applicable, according to a comparison of the calculation time with an acceptable delay of a target traffic.

The transferring unit 1330 may transfer information related to a result of the determination to a base station of a target cell.

Description described with reference to FIGS. 1 through 11 may be applied to each unit illustrated in FIGS. 12 and 13. Accordingly, detailed description of each unit will be omitted.

The method according to the above-described example embodiments may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a computer-readable storage medium may be distributed among computer systems connected through a network and computer-readable codes or program instructions may be stored and executed in a decentralized manner.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A communication method for a target cell of a multi-cell communication system, the method comprising:
identifying calculation sub-frames of a first group of cells, the first group of cells including the target cell among a plurality of cells included in the multi-cell communication system;
iteratively calculating, with a computer during the calculation sub-frames, spectrum powers for performing a dynamic spectrum management (DSM) scheme; and iteratively performing, in the calculation sub-frames, user scheduling for a candidate user set included in the target cell, wherein:

the spectrum powers are calculated for performing the DSM scheme according to a result of the user scheduling, and the plurality of cells are classified into a plurality of groups, and calculation sub-frames for at least one cell included in the first group of cells are distinct from calculation sub-frames for at least one cell included in a second group of cells.

2. The communication method of claim 1, wherein spectrum powers calculated for cells included in the second group of cells and a result of a user scheduling of the cells included in the second group of cells are held static during the calculation sub-frames of the first group of cells.

3. The communication method of claim 1, wherein the plurality of groups are determined according to identifications (IDs) of the plurality of cells or relative locations of the plurality of cells.

4. The communication method of claim 1, wherein the multi-cell communication system is a hierarchical cell communication system including at least one macrocell and at least one of a femtocell and a picocell.

5. The communication method of claim 1, further comprising transmitting data to at least one scheduled user according to the calculated spectrum powers.

6. The communication method of claim 1, further comprising periodically or aperiodically updating the candidate user set.

7. The communication method of claim 6, wherein the candidate user set is periodically or aperiodically updated in a predetermined sub-frame with respect to the first group of cells.

8. The communication method of claim 1, wherein the spectrum powers are calculated according to a weighted sum of spectrum powers calculated by a previous iteration and spectrum powers calculated by a current iteration.

9. The communication method of claim 1, wherein corresponding spectrum powers are calculated for each of the plurality of cells.

10. A non-transitory computer readable storage medium storing a program to apply a dynamic spectrum management (DSM) scheme to a multi-cell communication system, the medium comprising instructions to cause a computer to:

identify calculation sub-frames of a first group of cells, the first group of cells including a target cell among a plurality of cells included in the multi-cell communication system;

iteratively calculate, during the calculation sub-frames, spectrum powers to perform the DSM scheme; and iteratively perform, in the calculation sub-frames, user scheduling for a candidate user set included in the target cell, wherein:

the spectrum powers are calculated for performing the DSM scheme according to a result of the user scheduling, and the plurality of cells are classified into a plurality of groups, and calculation sub-frames for at least one cell included in the first group of cells are distinct from calculation sub-frames for at least one cell included in a second group of cells.

* * * * *